United States Patent [19]

Shirouzu

[11] Patent Number: 5,563,995
[45] Date of Patent: Oct. 8, 1996

[54] METHOD AND SYSTEM FOR DIRECTLY DRAWING A CONVEX POLYGON HAVING A GIVEN NUMBER OF VERTICES WITH HIGH SPEED

[75] Inventor: Hiroshi Shirouzu, Fukuoka, Japan

[73] Assignee: Matsushita Electric Industrial Co., Ltd., Osaka, Japan

[21] Appl. No.: 360,889

[22] Filed: Dec. 21, 1994

[30] Foreign Application Priority Data

Dec. 28, 1993 [JP] Japan .................................. 5-334355

[51] Int. Cl.⁶ .................................................. G06T 11/00
[52] U.S. Cl. .......................... 395/141; 395/126; 395/133
[58] Field of Search .................................. 395/141, 119, 395/126, 128–132, 133, 143, 149; 382/266, 267, 268, 269, 300

[56] References Cited

U.S. PATENT DOCUMENTS

5,422,991  6/1995  Fowler .................................. 395/143

*Primary Examiner*—Almis R. Jankus
*Attorney, Agent, or Firm*—Watson Cole Stevens Davis, P.L.L.C.

[57] ABSTRACT

A polygon drawing system for drawing a polygon at a high speed on such a display as a CRT display for use in computer graphics or the like, while eliminating the need for separating the polygon into triangles, includes a polygon vertex register for previously temporarily storing therein polygon vertex data on a draw polygon, a vertex manager for controllably causing the polygon vertex register to store therein the polygon vertex data under a predetermined condition, a start point register for sequentially monitoring the polygon vertex data being input, determining one of the polygon vertex data to be used as a drawing start vertex and previously temporarily storing the determined polygon vertex data therein, an outline generator for sequentially controlling a sequence of generating an outline of the polygon, a vertex address up counter for outputting to the polygon vertex register an address at which next clockwise polygon vertex data is stored according to the outline of the polygon, a vertex address down counter for outputting to the polygon vertex register an address at which next counterclockwise polygon vertex data is stored according to the outline of the polygon, interpolaters for performing interpolating operation over clockwise and counterclockwise outlines on the basis of the polygon vertex data indicated by the vertex address up and down counters, and a line drawer for drawing a polygon interpolate span with its both ends corresponding points of the clockwise and counterclockwise outlines obtained by the interpolaters. A method is also provided.

16 Claims, 11 Drawing Sheets

METHOD AND SYSTEM FOR DIRECTLY DRAWING A CONVEX POLYGON HAVING A GIVEN NUMBER OF VERTICES WITH HIGH SPEED

BACKGROUND OF THE INVENTION

1. Field of the Invention

The present invention relates to a polygon drawing method and system for drawing a polygon at a high speed on such a display as a CRT display for use in computer graphics or the like.

2. Description of the Related Art

In the computer graphics field, there has recently been utilized a drawer for carrying out high-speed drawing. As a technique for improving the drawing speed of such a drawer, there has been developed a technique which utilizes the function of a drawer to draw a polygon.

Figure 15:
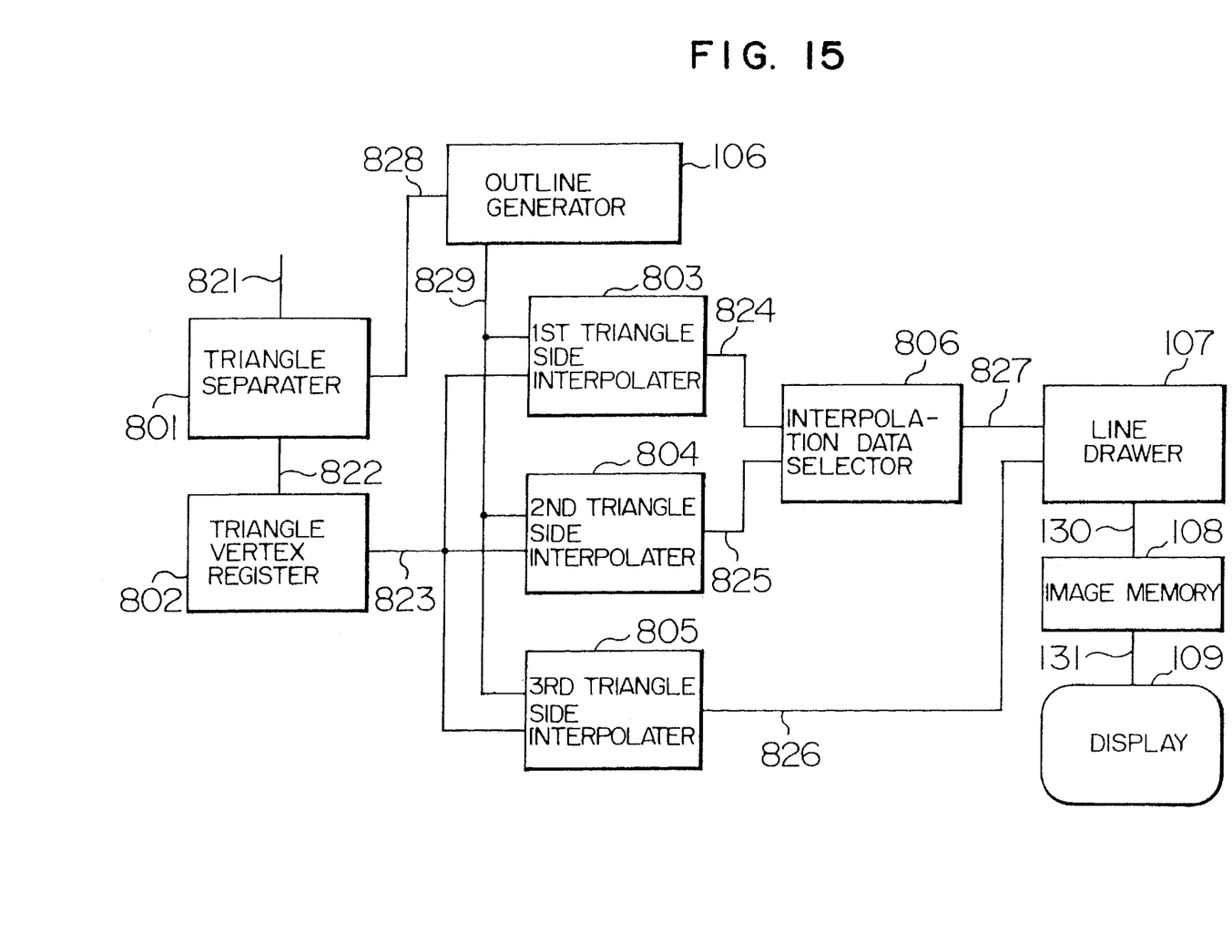
FIG. 15 is a block diagram of an arrangement of a prior art drawing system.

A technique for drawing a polygon with use of a prior art drawer system will be explained. FIG. 15 shows a block diagram of an arrangement of a prior art drawer, which includes a triangle separater 801, a triangle vertex register 802, a 1st triangle side interpolater 803, a 2nd triangle side interpolater 804, a 3rd triangle side interpolater 805, an interpolation data selector 806, a polygon vertex data 821, triangle vertex data 822, triangle side point data 823, interpolated line data 824 of the 1st triangle side, interpolated line data 825 of the 2nd triangle side, interpolated line data 826 of the 3rd triangle side, 2nd span point data 827, a triangle data valid signal 828, a next span send request 829, an outline generator 106, a line drawer 107, an image memory 108, a display 109, a memory write data signal 130, and a video signal 131.

Explanation will be made as to the operation of the drawer system having such an arrangement as mentioned above by referring to FIGS. 16–18.

Figure 16:
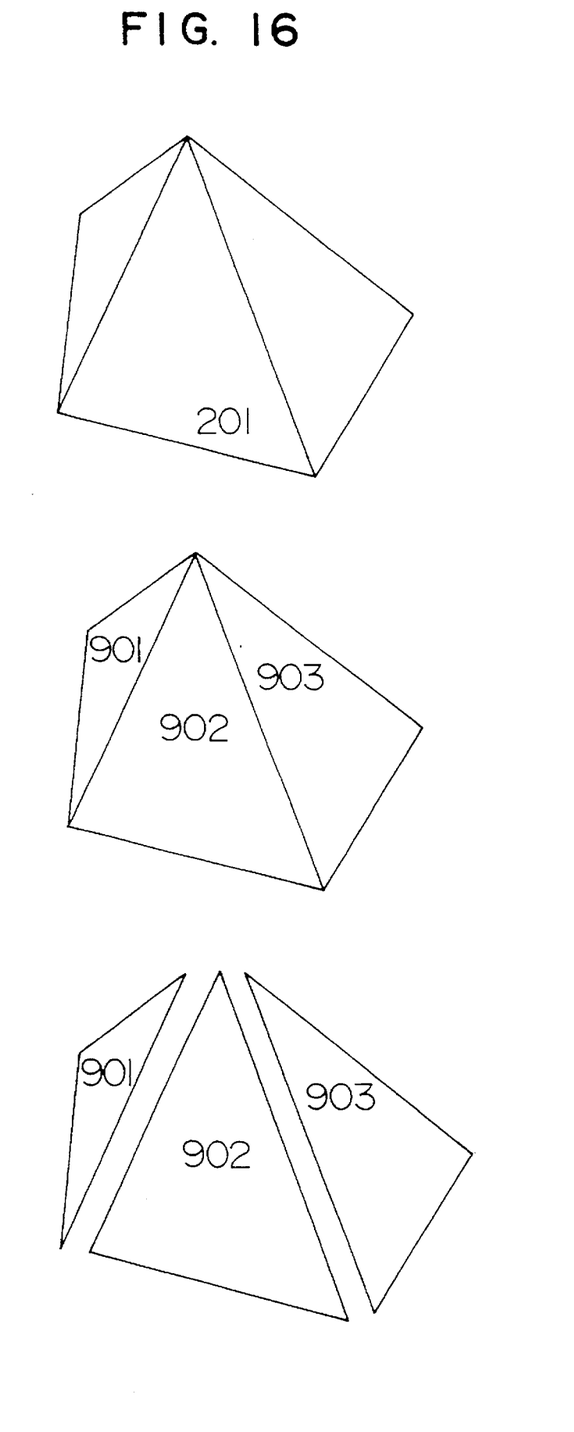
FIG. 16 shows diagrams for explaining triangle separating processes in the prior art drawing system.

Referring to FIG. 16, there are shown diagrams for explaining the triangle separating process of the prior art drawer system, in which reference numeral 201 denotes a draw polygon, 901 a 1st polygon separated triangle, 902 a 2nd polygon separated triangle, 903 a 3rd polygon separated triangle.

Figure 17:
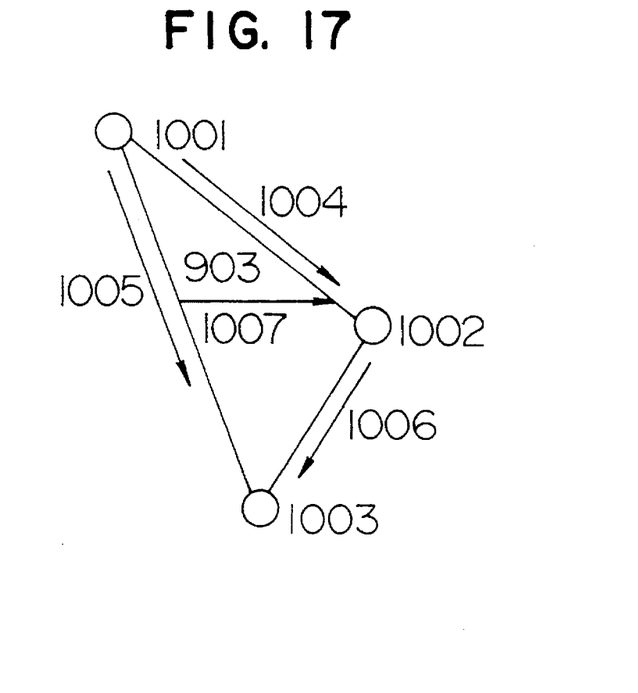
FIG. 17 is a diagram for explaining triangle interpolating operation based on span in the prior art drawing system.

FIG. 17 is a diagram for explaining the triangle interpolating process of the prior art drawer system based on span, in which 1001 denotes a 1st divided triangle vertex, 1002 a 2nd divided triangle vertex, 1003 a 3rd divided triangle vertex, 1004 a 1st divided triangle side, 1005 a 2nd divided triangle side, 1006 a 3rd divided triangle side, 1007 an interpolate horizontal span of the divided triangle.

Figure 18:
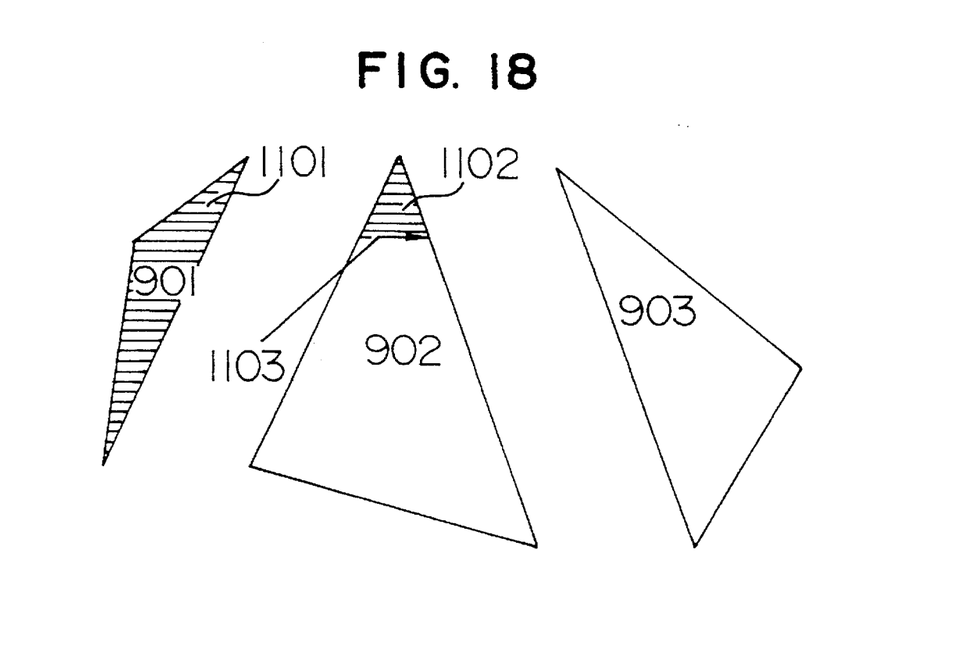
FIG. 18 shows diagrams for explaining polygon interpolating processes based on triangle in the prior art drawing system.

FIG. 18 is a diagram for explaining the polygon interpolating process of the divided triangles of the prior art drawer system, in which 1101 denotes a 1st polygon separated triangle interpolated by the horizontal span, 1102 a 2nd polygon separated triangle being interpolated by the horizontal span, and 1103 a horizontal span by which the 2nd polygon separated triangle is interpolated.

First, the polygon vertex data 821 of the draw polygon 201 is given to the triangle separater 801, the triangle separater 801 divides the draw polygon 201 into the 1st polygon separated triangle 901, 2nd polygon separated triangle 902 and 3rd polygon separated triangle 903 and sequentially generates the triangle vertex data 822 indicative of each triangle vertex.

Next, the triangle vertex register 802, when receiving the triangle vertex data 822 generated by the triangle separater 801, separates the received data into data indicative of one long side and two short sides and generates the triangle side point data 823 based on the drawing directions. The prior art drawer system performs an interpolating operation over the triangle with use of the horizontal line (which will be referred to as the horizontal span 1103 for interpolation of a polygon separated triangle, hereinafter) sequentially scanned vertically from the top to down on the display 109. To this end, the 1st divided triangle vertex 1001 as a side interpolation start vertex and the 2nd divided triangle vertex 1002 as a side interpolation terminate vertex are set in the 1st triangle side interpolater 803, the 1st divided triangle vertex 1001 as a side interpolation start vertex and the 3rd divided triangle vertex 1003 as a side interpolation terminate vertex are set in the 2nd triangle side interpolater 804, and the 2nd divided triangle vertex 1002 as a side interpolation start vertex and the 3rd divided triangle vertex 1003 as a side interpolation terminate vertex are set in the 3rd triangle side interpolater 805, respectively.

Accordingly the 1st divided triangle side 1004 is set in the 1st triangle side interpolater 803, the 2nd divided triangle side 1005 is set in the 2nd triangle side interpolater 804, and the 3rd divided triangle side 1006 is set in the 3rd triangle side interpolater 805. This means that all the sides of the triangle are subjected to the interpolating operation.

The outline generator 106, when receiving the triangle data valid signal 828 indicative of the completion of separation of the triangle, outputs the next span send request 829 as a triangle side interpolation control signal to the 1st triangle side interpolater 803, 2nd triangle side interpolater 804 and 3rd triangle side interpolater 805.

The 1st triangle side interpolater 803 and 3rd triangle side interpolater 805, when receiving the next span send request 829, advances the triangle side interpolation by one unit. That is, the 1st triangle side interpolater 803 generates the interpolated line data 824 of the 1st triangle side indicative of a second triangle side interpolation coordinate point, while the 3rd triangle side interpolater 805 generates the interpolated line data 826 of the 3rd triangle side indicative of a first triangle side interpolation coordinate point.

The interpolation data selector 806 selects the interpolated line data 824 of the 1st triangle side generated by the 1st triangle side interpolater 803 and generates the 2nd span point data 827 indicative of a span terminate coordinate point.

Next, the line drawer 107, on the basis of the 2nd span point data 827 as span coordinate information on the triangle and the interpolated line data 826 of the 3rd triangle side as the 1st span point coordinate data, performs its interpolating operation and generates the memory write data signal 130 to be written in the image memory 108.

The image memory 108 receives the memory write data signal 130 writes a corresponding graphic pattern in its image memory region. The graphic pattern written in the image memory region generates the video signal 131 as an image display signal in synchronism with the display timing. And the display 109 performs its displaying operation on the basis of the video signal 131 generated by the image memory 108.

When the 1st triangle side interpolater 803 completes the triangle side interpolating operation of the 1st divided triangle side 1004, the interpolation data selector 806 selects the interpolated line data 825 of the 2nd triangle side generated by the 2nd triangle side interpolater 804 and generates the 2nd span point data 827 indicative of a span terminate coordinate point. When the 2nd triangle side interpolater 804 completes its triangle side interpolating operation of the 2nd divided triangle side 1005, this means that one triangle has been drawn. In a similar way, the remaining triangles are drawn. When all the triangles of the polygon have been drawn, this means that the drawing of the polygon has been completed.

As mentioned above, the prior art drawer system requires the triangle separating operation based on the function of the line drawer and also requires the respective drawing operations of the separated triangles. Further, the triangle drawing operation needs the triangle side judging operation and the triangle side setting operation to the triangle side interpolater. For this reason, the triangle side operation, which is unnecessary for display of a polygon in itself, must be doubly carried out, which becomes an obstacle to improving the drawing speed.

SUMMARY OF THE INVENTION

It is an object of the present invention to provide a polygon drawing method and system which enable high-speed, continuous drawing of a polygon while eliminating the need for separating the polygon into triangles.

In accordance with an aspect of the present invention, there is provided a polygon drawing system which comprises a polygon vertex register for previously temporarily storing therein polygon vertex data on a draw polygon, vertex management means for controllably causing the polygon vertex register to store therein the polygon vertex data under a predetermined condition, a start point register for sequentially monitoring the polygon vertex data being input, determining one of the polygon vertex data to be used as a drawing start vertex and previously temporarily storing the determined polygon vertex data therein, outline generation means for sequentially controlling a sequence of generating an outline of the polygon, a vertex address up counter for outputting to the polygon vertex register an address at which next clockwise polygon vertex data is stored according to the outline of the polygon, a vertex address down counter for outputting to the polygon vertex register an address at which next counterclockwise polygon vertex data is stored according to the outline of the polygon, interpolation means for performing interpolating operation over clockwise and counterclockwise outlines on the basis of the polygon vertex data indicated by the addresses obtained by the vertex address up and down counters, and line drawing means for drawing a polygon interpolate span with its both ends corresponding points of the clockwise and counterclockwise outlines obtained by the interpolation means.

With such an arrangement, interpolation of the clockwise polygon outline and interpolation of the counterclockwise polygon outline are carried out at the same time, and at each time when the interpolation of clockwise and counterclockwise polygon outlines are carried out, drawing of the polygon interpolate span is carried out, whereby the polygon interpolate span can be carried out from the vertex indicated by the start point register along the outline of the polygon.

Thus, in the present invention, the polygon can be drawn continuously at a high speed while eliminating the need for separating the polygon into triangles.

DESCRIPTION OF THE PREFERRED EMBODIMENTS

Figure 1:
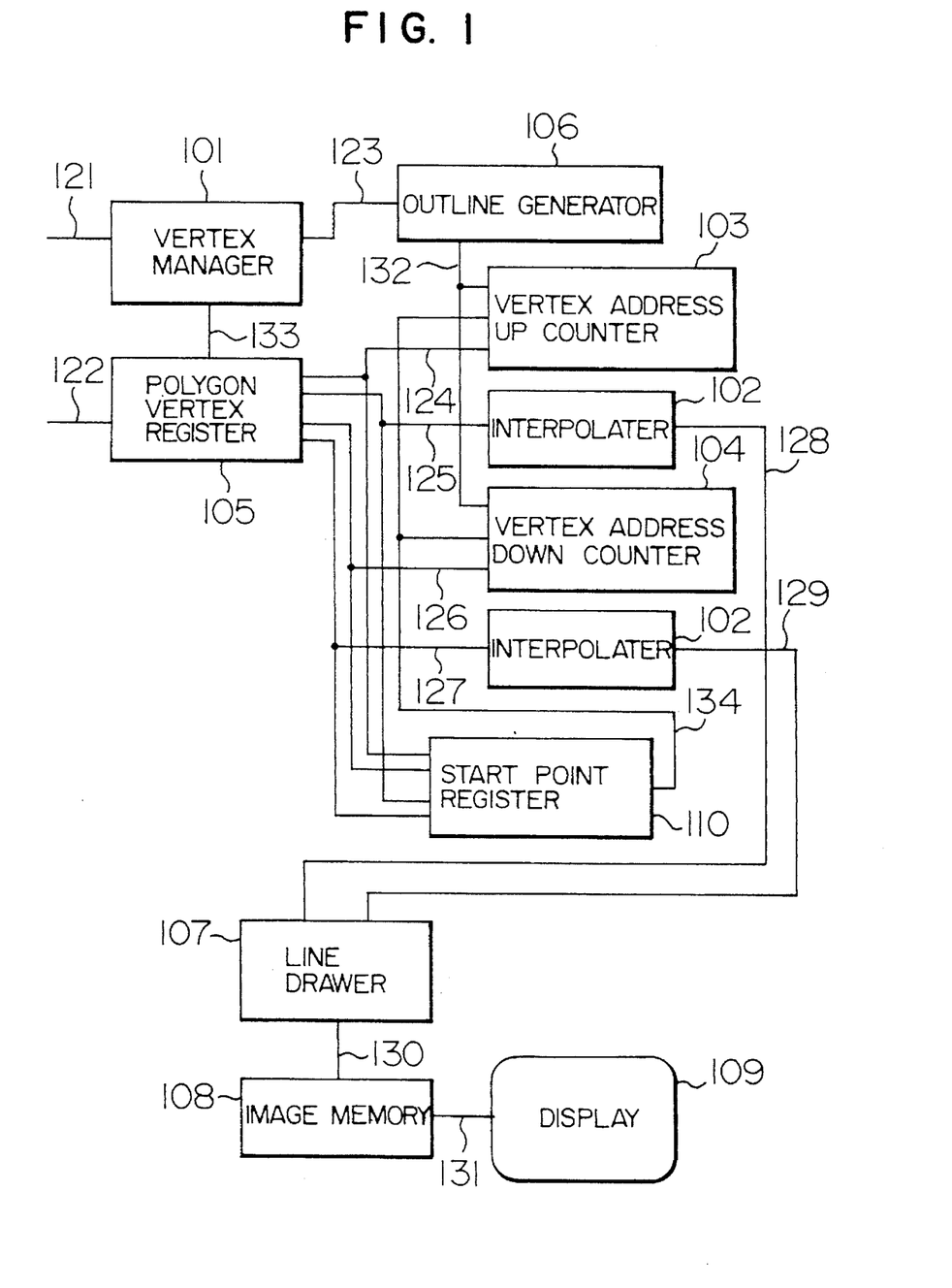
FIG. 1 is a block diagram of an arrangement of a polygon drawing system in accordance with an embodiment of the present invention.

An embodiment of the present invention will be explained with reference to the accompanying drawings. Referring first to FIG. 1, there is shown a block diagram of an arrangement of a polygon drawing system in accordance with an embodiment of the present invention, which includes a vertex manager 101, interpolaters 102, a vertex address up counter 103, a vertex address down counter 104, a polygon vertex register 105, an outline generator 106, a line drawer 107, an image memory 108, a display 109, and a start point register 110.

Signals transferred between these blocks include a polygon data control signal 121, a polygon vertex data signal 122, a polygon data valid signal 123, a 1st vertex data address signal 124, a 1st vertex data data signal 125, a 2nd vertex data address signal 126, a 2nd vertex data data signal 127, a 1st span point vertex signal 128, a 2nd span point vertex signal 129, a memory write data signal 130, a video signal 131, a next vertex send request 132, a polygon vertex data write signal 133, and a start point address signal 134.

Figure 2:
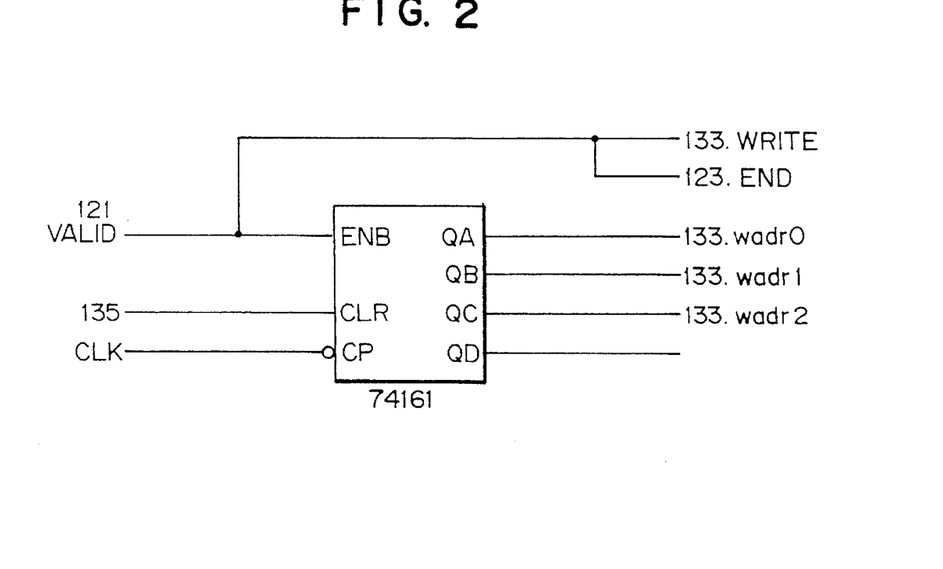
FIG. 2 is a block diagram of an arrangement of a vertex manager in FIG. 1.

Shown in FIG. 2 is a block diagram showing the structure of the vertex manager 101 in FIG. 1. In FIG. 2, the vertex manager 101, which comprises a latch element, is connected to a control bus line so that when the vertex manager 101 latches a control signal within the control bus line, the manager obtains the polygon data valid signal 123 and polygon vertex data write signal 133 from the polygon data control signal 121.

Figure 3:
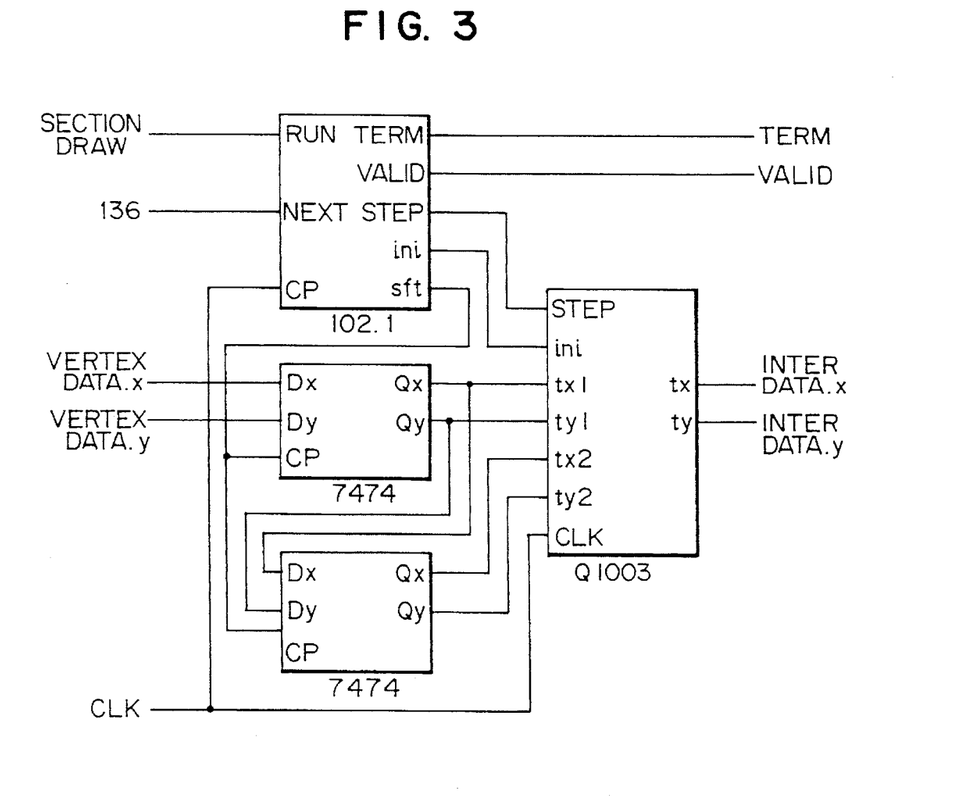
FIG. 3 is a block diagram of an arrangement of an interpolater in FIG. 1.

FIG. 3 is a block diagram of the structure of each of the interpolaters 102 in FIG. 1. The interpolater 102 comprises a state transition circuit 102.1, a line interpolation coordinate operating element Q1003, and two D type flip-flops. More specifically, the line interpolation coordinate operating element Q1003 performs line interpolation coordinate calculation on the basis of coordinate data of an initial and next vertexes stored in the two D type flip-flops. The state transition circuit 102.1 controls the start/stop sequence and soon of the line interpolation coordinate operating element Q1003.

Figure 4:
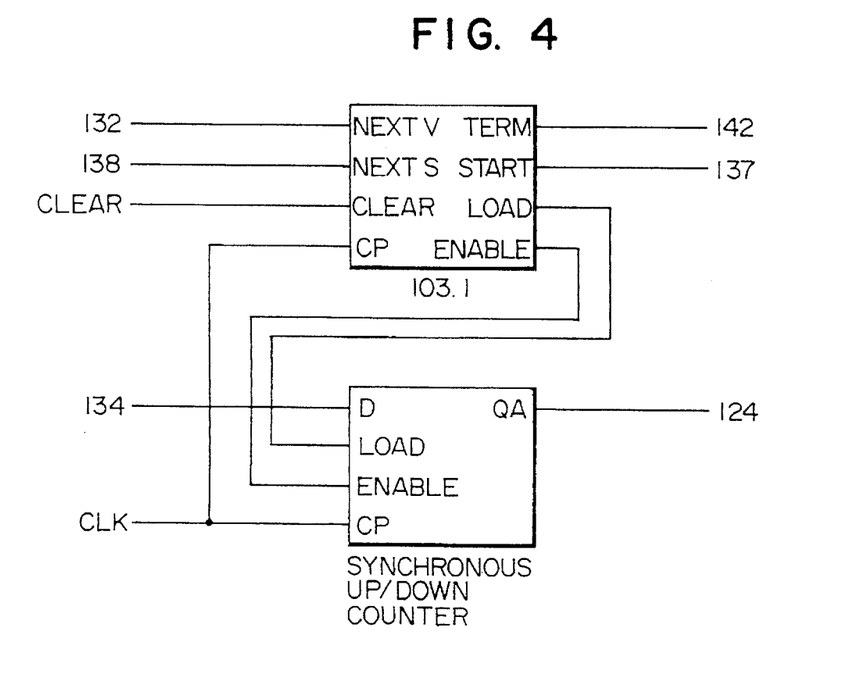
FIG. 4 is a block diagram of an arrangement of vertex address up and down counters in FIG. 1.

FIG. 4 is a block diagram of a structure of the vertex address up and down counters 103 and 104 in FIG. 1. The illustrated up and down counters are subjected to the sequence control of a state transition circuit 103.1.

Figure 5:
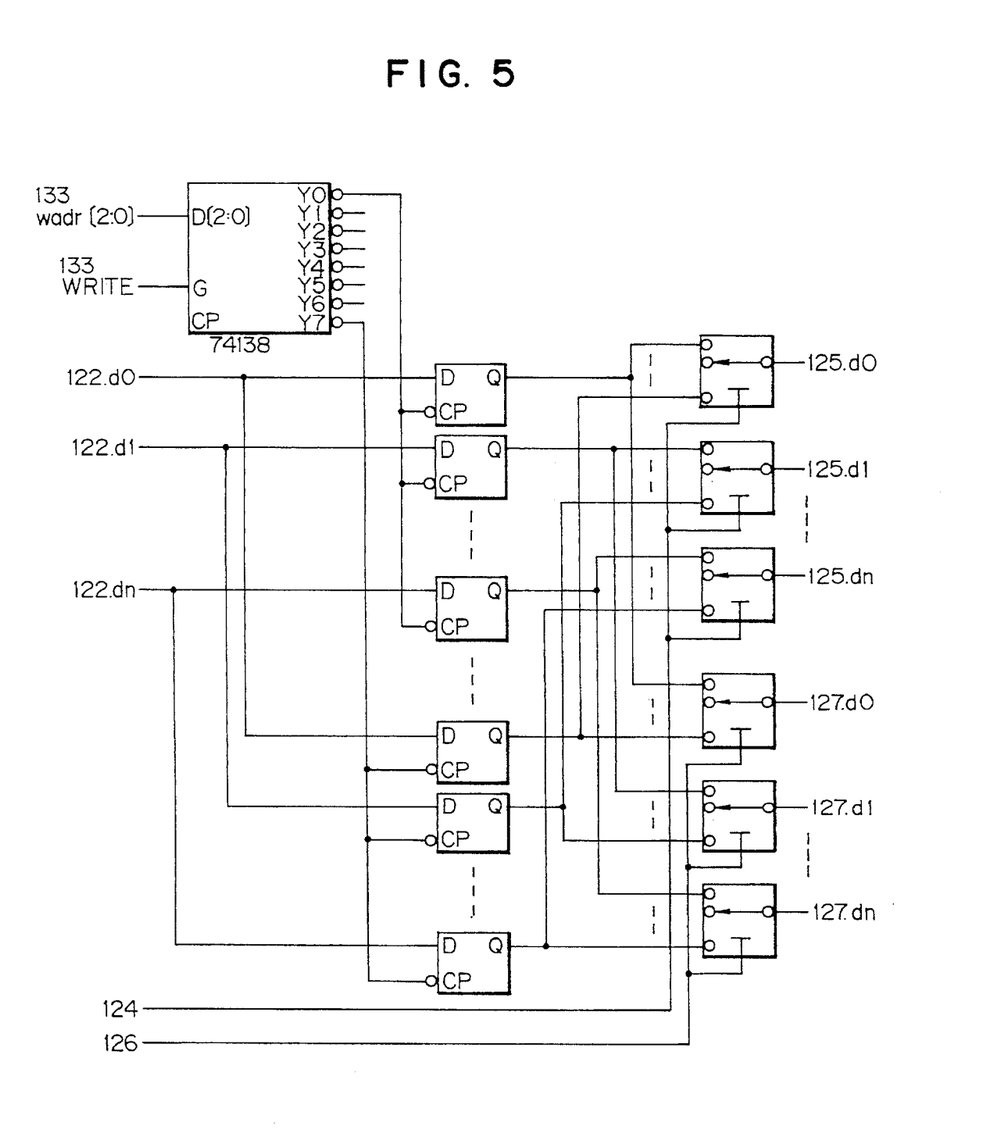
FIG. 5 is a block diagram of an arrangement of a polygon vertex register in FIG. 1.

Referring to FIG. 5, there is shown a block diagram of the structure of the polygon vertex register 105 in FIG. 1. The illustrated polygon vertex register 105, which comprises a multi-port S-RAM, can temporarily store and read out address and data signals of a plurality of vertex data therein and therefrom.

Figure 6:
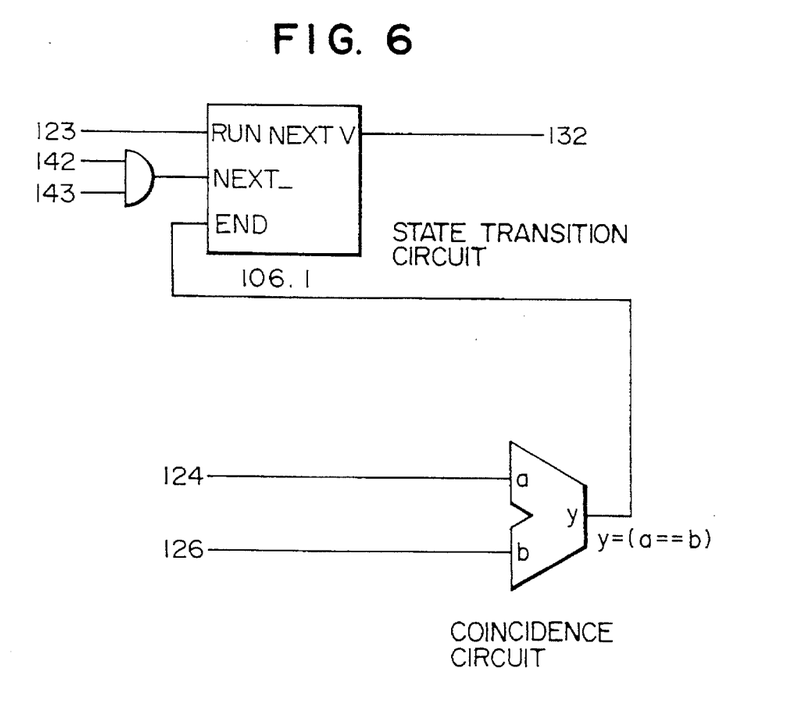
FIG. 6 is a block diagram of an arrangement of an outline generator in FIG. 1.

Shown in FIG. 6 is a block diagram of the structure of the outline generator 106 in FIG. 1. The illustrated outline generator 106 comprises a coincidence circuit and a state transition circuit 106.1. The state transition circuit 106.1 functions to sequentially control the outline generating process. More specifically, the state transition circuit 106.1, when receiving the polygon data valid signal 123 or the vertex next signals 142 and 143, outputs the next vertex send request 132. When the coincidence circuit detects a coincidence between the 1st and 2nd vertex data address signals 124 and 126, the state transition circuit 106.1 receives an end signal from the coincidence circuit and returns to its idle state.

Figure 7:
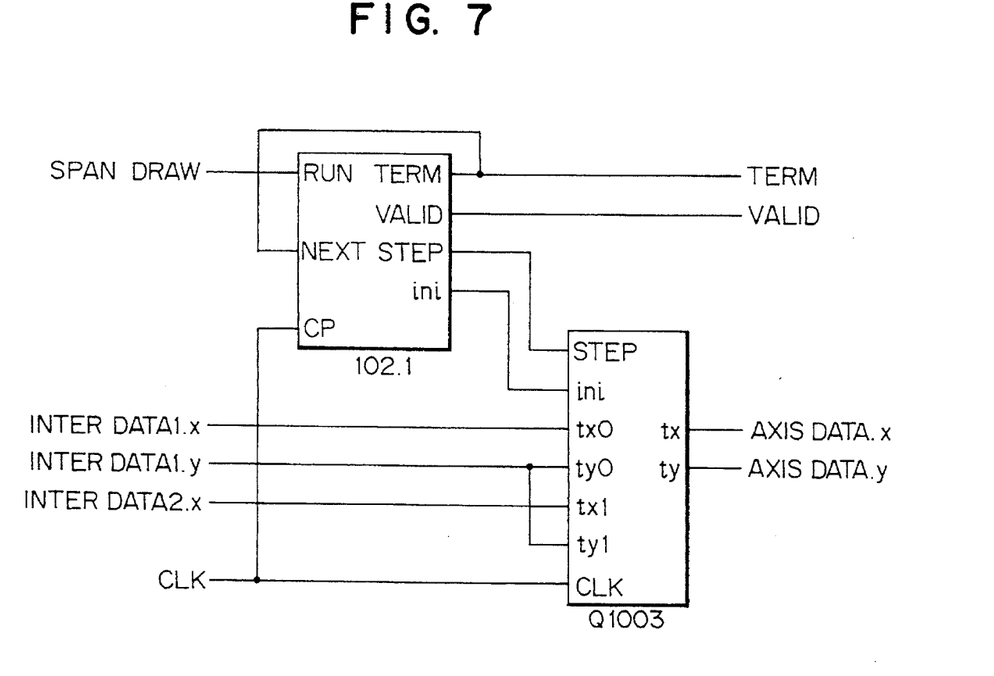
FIG. 7 is a block diagram of an arrangement of a line drawer in FIG. 1.

Referring to FIG. 7, there is shown a block diagram of the structure of the line drawer 107 in FIG. 1, which structure corresponds to the structure of the interpolater 102 of FIG. 3 but with the D type flip-flops being removed. In more detail, the line interpolation coordinate operating element Q1003 calculates the line interpolation coordinate point on the basis of the 1st and 2nd span point vertex signals 128 and 129 obtained from the two interpolaters 102. The state transition circuit 102.1 controls the start/stop of the line interpolation coordinate operating element Q1003.

Figure 8:
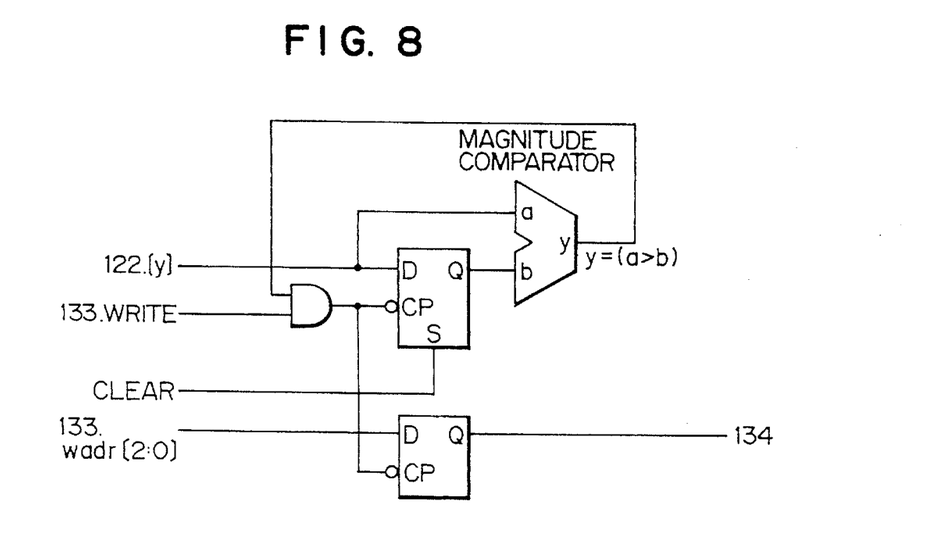
FIG. 8 is a block diagram of an arrangement of a start point register in FIG. 1.

FIG. 8 is a block diagram of the structure of the start point register 110 in FIG. 1. The illustrated start point register 110 comprises two D type flip-flops, an arithmetic magnitude comparator, and an AND gate. Stored at terminals Q of the D type flip-flops is the previous-time input minimum value. The arithmetic magnitude comparator compares a new input polygon vertex data signal 122 with the previous-time Q value and outputs its true/false result as an input of the AND gate. Accordingly, only when a new minimum value is input, a latch signal is outputted and the polygon vertex data write signal 133 is renewed.

Figure 9:
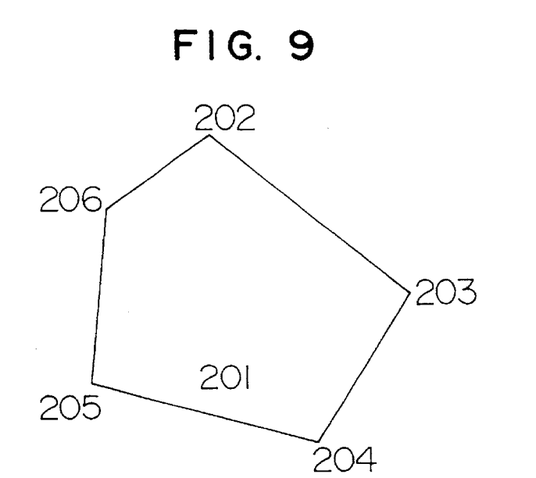
FIG. 9 is a diagram for explaining a draw polygon.

FIG. 9 shows a draw polygon, in which 201 denotes the draw polygon, 202 a 1st vertex data of the draw polygon, 203 a 2nd vertex data of the draw polygon, 204 a 3rd vertex data of the draw polygon, 205 a 4th vertex data of the draw polygon, 206 a 5th vertex data of the draw polygon.

Figure 10:
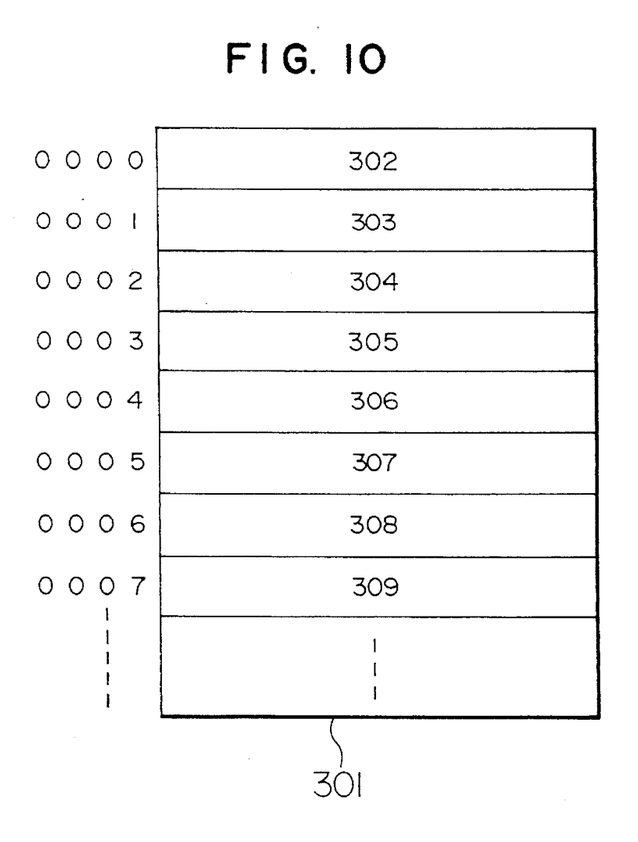
FIG. 10 shows contents of the polygon vertex register.

FIG. 10 shows contents of the polygon vertex register 105, in which 301 indicates contents of the polygon vertex register 105, 302 a 1st polygon vertex data, 303 a 2nd polygon vertex data, 304 a 3rd polygon vertex data, 305 a 4th polygon vertex data, 306 a 5th polygon vertex data, 307 a 6th polygon vertex data, 308 a 7th polygon vertex data, and 309 a 8th polygon vertex data.

Figure 11:
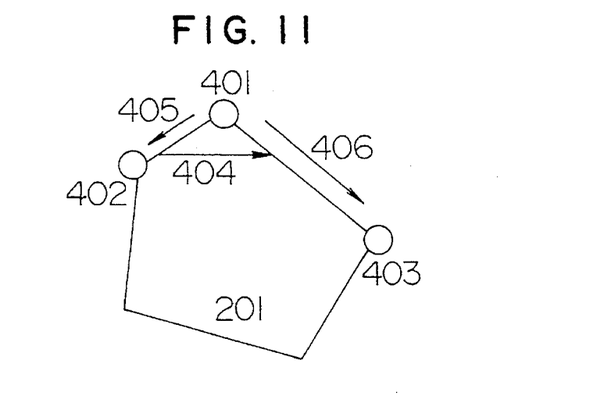
FIG. 11 is a diagram for explaining how to generate span points.

FIG. 11 is a diagram for explaining how to generate a span point, in which 401 indicates a starting vertex of the draw polygon, 402 a polygon interpolated vertex of counterclockwise, 403 a polygon interpolated vertex of clockwise, 404 a polygon interpolate span, 405 a polygon outline interpolated counterclockwise, and 406 a polygon outline interpolated clockwise.

More specifically, the line drawer 107 draws the polygon interpolate span 404 on the basis of the 1st and 2nd span point vertex signals 128 and 129 obtained from the two interpolaters 102.

The starting vertex 401 of the draw polygon has been given at the uppermost position in the drawing of the illustrated example, which follows the common practice that, in the case of a general CRT display, a left, upper end is set as the origin of the screen. Accordingly, it goes without saying that, when it is desired to use another display 109, the display is done with an origin position set suitably for the used display 109.

Figure 12:
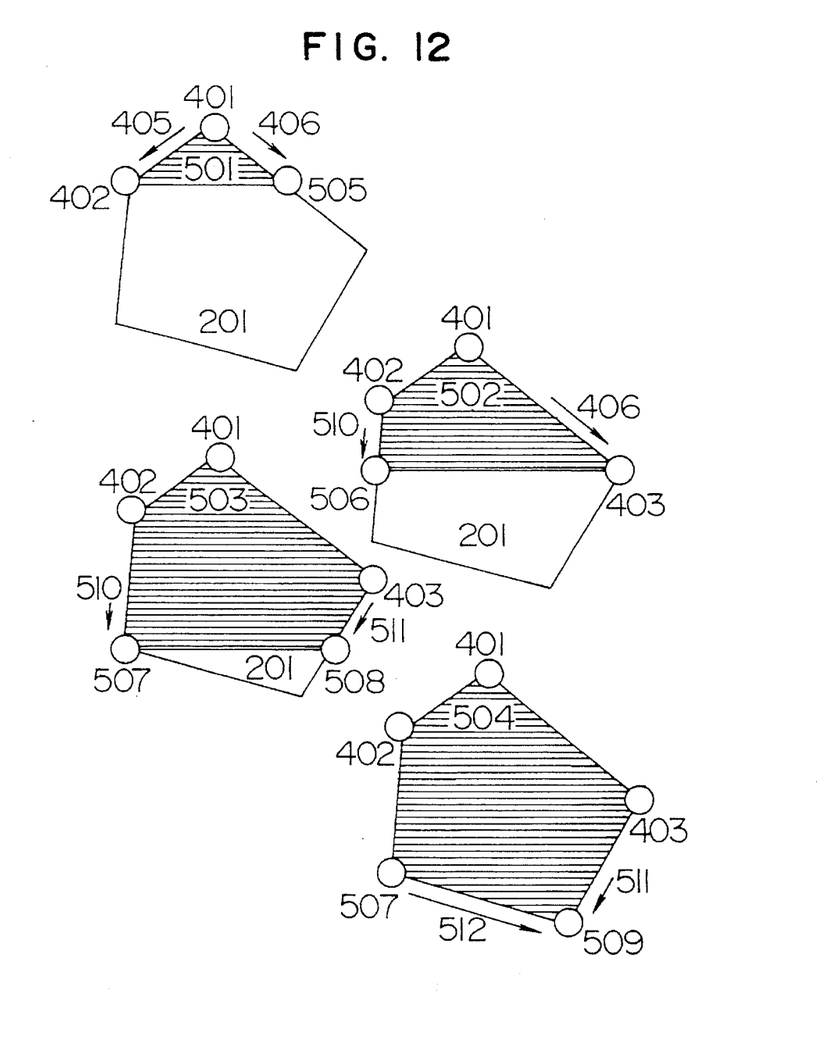
FIG. 12 shows diagrams for explaining polygon interpolation based on polygon interpolate horizontal span.

FIG. 12 shows diagrams for explaining the polygon interpolation based on the polygon interpolate span, showing processes in which the polygon interpolate span 404 (refer to FIG. 11) is sequentially horizontally stacked to complete polygon drawing. In the drawing, 501 denotes an area of polygon drawing process 1, 502 an area of polygon drawing process 2, 503 an area of polygon drawing process 3, 504 an area of polygon drawing process 4, 505 an interpolation terminate point of the polygon drawing process 1, 506 an interpolation terminate point of the polygon drawing process 2, 507 a 2nd polygon interpolated vertex of counterclockwise, 508 an interpolation terminate point of the polygon drawing process 3, 509 a polygon interpolation terminate vertex, 510 a 2nd counterclockwise polygon outline, 511 a 2nd clockwise polygon outline, and 512 a 3rd counterclockwise polygon outline.

Explanation will next be made as to the drawing processes and operation of the polygon drawing system arranged as mentioned above in accordance with an embodiment of the present invention, by referring to the drawings. First, in order to draw the draw polygon 201 on the display 109, the 1st vertex data 202 of the draw polygon, the 2nd vertex data 203 of the draw polygon, the 3rd vertex data 204 of the draw polygon, the 4th vertex data 205 of the draw polygon and the 5th vertex data 206 of the draw polygon are sequentially transferred to the polygon vertex register 105 in synchronism with the polygon data control signal 121. The vertex manager 101 receives the polygon data control signal 121, and asserts the polygon vertex data write signal 133 to write the 1st vertex data of the draw polygon 202 in the 1st polygon vertex data 302, the 2nd vertex data of the draw polygon 203 in the 2nd polygon vertex data 303, the 3rd vertex data of the draw polygon 204 in the 3rd polygon vertex data 304, the 4th vertex data of the draw polygon 205 in the 4th polygon vertex data 305, and the 5th vertex data of the draw polygon 206 in the 5th polygon vertex data 306, respectively. The start point register 110 sequentially compares the Y axis components of the draw polygon vertex data to determine an interpolation start point. Since the 1st polygon vertex data 302 has a minimum Y axis component in the present embodiment, the start point register 110 outputs "0000" as the start point address signal 134.

Next, after fully transferring all the vertex data of the draw polygon 201, the vertex manager 101 asserts the polygon data valid signal 123 indicative of the fact that all the vertex data of the polygon were fully input to the polygon vertex register 105. The outline generator 106, when receiving the polygon data valid signal 123, asserts the next vertex send request 132 to be sent to the vertex address up and down counters 103 and 104 to ask them to decide the vertex addresses of start and end points.

The vertex address up counter 103, when receiving the next vertex send request 132, first outputs an address indicative of the start point address signal 134 and the 1st vertex data address signal 124 indicative of a next address at which a next vertex is stored. At the same time, the vertex address down counter 104, when receiving the next vertex send request 132, first outputs an address indicative of the start point address signal 134 and the 2nd vertex data address signal 126 indicative of a previous address at which the next vertex is stored.

In the example of FIG. 10, more in detail, the vertex address up counter 103 outputs "0000" as the address of the 1st polygon vertex register, and outputs "0001" as the address of the 2nd polygon vertex register. The vertex address down counter 104 outputs "0000" as the address of the 1st polygon vertex register, and outputs "0004" as the address of the 2nd polygon vertex register.

The polygon vertex register 105, on the basis of the 1st vertex data address signal 124 received from the vertex address up counter 103, outputs the clockwise start polygon vertex data and the clockwise terminate polygon vertex data in the form of the 1st vertex data signal 125, while the polygon vertex register 105, on the basis of the 2nd vertex data address signal 126 received from the vertex address down counter 104, outputs the counterclockwise start polygon vertex data and the counterclockwise terminate polygon vertex data in the form of the 2nd vertex data data signal 127. In this way, one of the interpolaters 102 receiving the 1st vertex data data signal 125 performs its clockwise polygon outline interpolating operation. Meanwhile, the other interpolater 102 receiving the 2nd vertex data data signal 127 performs its counterclockwise polygon outline interpolating operation.

In this way, two interpolaters 102 perform its interpolation operations of the polygon outline interpolated line 406 of clockwise and the polygon outline interpolated line 405 of counterclockwise at the same time (refer to FIG. 11), and at each time the outer polation operations are performed, the interpolaters generate the polygon interpolate span 404 having an end point of coordinate values corresponding to its intermediate result.

The line drawer 107, when receiving the polygon interpolate span 404, performs its horizontal line interpolating operation. In the present embodiment, the interpolater 102 receiving the 2nd vertex data data signal 127 first reaches its final end point (refer to FIG. 11: polygon interpolated vertex of counterclockwise 402), and when this interpolater 102 reaches the final end point, this causes the vertex address down counter 104 to advance its count by "1" (down count 1).

When the vertex address down counter 104 advances one count, the 2nd vertex data address signal 126 is updated so that the polygon vertex register 105 outputs 2 vertex coordinate data of a next counterclockwise polygon outline as the 2nd vertex data data-signal 127. The interpolater 102 receiving the 2nd vertex data data signal 127, on the basis of the 2nd vertex data data signal 127, perform its continuous interpolating operation. Accordingly, the interpolation parameters of the polygon outline interpolated line 405 of counterclockwise are renewed so that the interpolation is advanced toward the 2nd counterclockwise polygon outline 510 (refer to FIG. 12).

The interpolater 102 receiving the 1st vertex data data signal 125 and the interpolater 102 receiving the 2nd vertex data data signal 127 advance their polygon interpolating operations from the area 501 of polygon drawing process 1 continuously toward the area 502 of polygon drawing process 2 because the interpolation is advanced in synchronism with each other.

When the interpolater 102 receiving the 1st vertex data data signal 125 completes its interpolating operation of the polygon outline interpolated line 406 of clockwise, this causes the vertex address up counter 103 to be similarly advanced by one count as in the above case. And line parameters of the 2nd polygon outline of interpolated CW 511 as the next polygon outline are read out from the polygon vertex register 105 and set in the interpolater 102 receiving the 1st vertex data data signal 125. In this way, polygon interpolation of the area 503 of polygon drawing process 3 is continuously advanced.

Next, the interpolater 102 receiving the 2nd vertex data data signal 127 completes its interpolation operation of the 2nd polygon outline of interpolated CCW 510, this similarly causes the vertex address down counter 104 to be advanced by one count. And line parameters of the 3rd polygon outline of interpolated counterclockwise 512 as the next polygon outline are read out from the polygon vertex register 105 and set in the interpolater 102 receiving the 2nd vertex data data signal 127. In this way, polygon interpolation of the area 504 of polygon drawing process 4 is continuously advanced.

At this time, since the final vertex polygon vertex register address of the vertex address up counter 103 is equal to the final vertex polygon vertex register address of the vertex address down counter 104, the outline generator 106 recognizes that the current outline interpolation is for the final outline.

Next, since the final arrival end point of the interpolater 102 receiving the 1st vertex data data signal 125 is the same as that of the interpolater 102 receiving the 2nd vertex data data signal 127, the interpolation of the 2nd polygon outline of interpolated CW 511 and the interpolation of the 3rd polygon outline of interpolated CCW 512 are simultaneously terminated and the drawing of the draw polygon 201 is terminated, as a matter of course.

As mentioned above, in accordance with the present embodiment, continuous interpolation can be realized while eliminating the need for dividing a polygon into triangles, and therefore the polygon can be drawn at a high speed.

Figure 13:
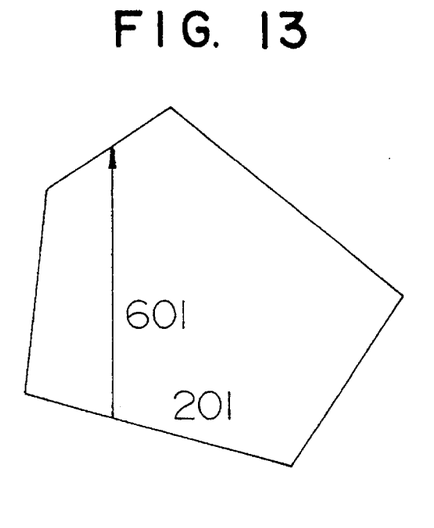
FIG. 13 is a diagram for explaining how to generate a polygon interpolate vertical span.

Similarly, when the Y axis is replaced by the X axis, the present invention can be optimumly used as a drawing system suitable for a vertical scan type display device. FIG. 13 is a diagram for explaining how to generate the polygon interpolation vertical span.

Explanation will next be made as to a polygon drawing system in accordance with another embodiment of the present invention. The structure of the drawing system of the present embodiment is the same as that of FIG. 1, except that the start point register 110 has a memory function which follows.

More specifically, the start point register 110 has such a memory function. That is, the size of the polygon in the X axis direction is sequentially compared with the size of the polygon in the Y axis direction from the coordinate information of the polygon contained in the polygon data control signal 121, so that the start point register 110 has a function of storing the address of the polygon vertex register 105 having the smallest axis direction components. Accordingly, the block diagram of FIG. 8 corresponds to a block diagram of an X and Y axis arrangement, and thus its operation includes the X and Y axis operations as a matter of course.

Figure 14:
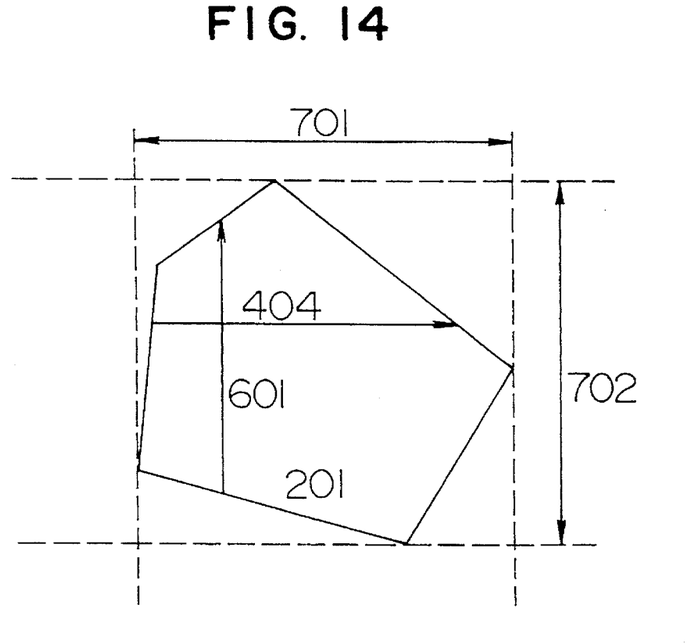
FIG. 14 is a diagram for explaining how to generate an optimum-direction polygon interpolate span.

Therefore, the interpolater 102 determines as its optimum axis direction smaller one of the polygon X and Y axis direction sizes stored in the start point register 110, and performs its interpolating operation over the optimum axis direction. Such a manner, i.e., how to generate an optimum direction polygon interpolation span is shown in FIG. 14, in which 404 designates a polygon interpolate span, 601 a polygon interpolate vertical span, 701 a polygon horizontal length, and 702 a polygon vertical length.

The operation of the polygon drawing system arranged as mentioned above in accordance with the other embodiment of the present invention will be explained by referring to the accompanying drawings.

First, in order to draw the draw polygon 201, the 1st vertex data 202 of the draw polygon, the 2nd vertex data 203 of the draw polygon, the 3rd vertex data 204 of the draw polygon, the 4th vertex data 205 of the draw polygon and the 5th vertex data 206 of the draw polygon are sequentially transferred to the polygon vertex register 105 in synchronism with the polygon data control signal 121. The vertex manager 101, when receiving the polygon data control signal 121, asserts the polygon vertex data write signal 133 to write the 1st vertex data 202 of the draw polygon in the 1st polygon vertex data 302, the 2nd vertex data 203 of the draw polygon in the 2nd polygon vertex data 303, the 3rd vertex data 204 of the draw polygon in the 3rd polygon vertex data 304, the 4th vertex data 205 of the draw polygon in the 4th polygon vertex data 305, and the 5th vertex data 206 of the draw polygon in the 5th polygon vertex data 306, respectively.

The start point register 110 sequentially compares the X and Y axis components of the polygon vertex data with respect to their magnitude and determines X and Y direction interpolation start points. At the same time, the polygon horizontal length 701 and the polygon vertical length 702 are found to generate a span in a direction of longer one of the horizontal and vertical lengths and also to stack the span in the shorter-length direction. In this way, the number of span generation times can be reduced and thus the overall processing time can be shortened.

In accordance with the present embodiment, since the polygon vertical length 702 can be made short (refer to FIG. 14) and the 1st polygon vertex data 302 can have the minimum Y component (refer to FIG. 10), the start point register 110 can output "0000" as the start point address signal 134.

In the manner mentioned above, the interpolation start point is determined and the span generation direction is determined. And the subsequent polygon drawing processes are carried out in substantially the same manner as explained in connection with the foregoing embodiment of the present invention.

That is, the explanation after all the vertex data of the draw polygon 201 are completely transferred until the drawing of the draw polygon 201 is completed is exactly the same as in the foregoing embodiment of the present invention, and thus explanation thereof is omitted.

Further, in order to realize matching of the origin representations of the display 109, the magnitude comparator shown in FIG. 8 has been designed to calculate the minimum value and the coordinate minimum values have been given in FIGS. 9 to 14 as the drawing start point in the foregoing embodiment of the present invention. However, it should be obviously appreciated from the above disclosed contents of the invention that the present invention is not limited to the above specific examples but the arithmetic magnitude comparator may be designed to calculate a maximum value and the coordinate maximum values may be used as a drawing start point, as a matter of course.

In accordance with the present embodiment, as has been explained in the foregoing, there can be provided such a polygon drawing system that can directly and continuously perform its side operations necessary for display of a polygon in itself while eliminating the need for dividing the polygon into triangles, and thus can draw the polygon at a high speed,

What is claimed is:

1. A polygon drawing method comprising:
   a polygon vertex memory step of storing polygon vertex data relating to a polygon;
   a start point memory step of determining and storing one of the polygon vertex data as a draw start vertex;
   an outline generation step of sequentially generating an outline of the polygon;
   a vertex address addition step of generating an address at which data of a next clockwise polygon vertex determined relative to said draw start vertex is stored according to the outline of the polygon;
   a vertex address substraction step of an address at which data of a next counterclockwise polygon vertex determined relative to said draw start vertex is stored according to the outline of the polygon;
   an interpolation step of performing an interpolating operation over clockwise and counterclockwise portions of the outline of the polygon on the basis of the data of the next clockwise polygon vertex and the next counterclockwise polygon vertex; and
   a span drawing step of drawing a polygon interpolate span having ends located on the clockwise and counterclockwise portions of the outline,
   wherein said interpolation step is carried out with respect to the clockwise and counterclockwise portions of the outline at the same time, and at each time when the interpolation step is carried out, said span drawing step is carried out to draw said polygon interpolate span from said drawing start vertex along the outline.

2. A polygon drawing method as set forth in claim 1, wherein said start point memory step includes a minimum Y axis component value extraction step of comparing the polygon vertex data and extracting one of the polygon vertex data having a smallest Y axis direction component value, said interpolation step is carried out from a vertex corresponding to the minimum Y axis component value shown by said minimum Y axis component value extraction step along the outline of the polygon in an X axis direction, and said polygon interpolate span is drawn as stacked in a Y axis direction.

3. A polygon drawing method as set forth in claim 1, wherein said start point memory step includes a maximum Y axis component value extraction step of comparing the polygon vertex data and extracting one of the polygon vertex data having a maximum Y axis direction component value, said interpolation step is carried out from a vertex corresponding to the maximum Y axis component value shown by said maximum Y axis component value extraction step along the outline of the polygon in an X axis direction, and said polygon interpolate span is drawn as stacked in a Y axis direction.

4. A polygon drawing method as set forth in claim 1, wherein said start point memory step includes a minimum X axis component value extraction step of comparing the polygon vertex data and extracting one of the polygon vertex data having a smallest X axis direction component value, said interpolation step is carried out from a vertex corresponding to the minimum X axis component value shown by said minimum X axis component value extraction step along the outline of the polygon in a Y axis direction, and said polygon interpolate span is drawn as stacked in an X axis direction.

5. A polygon drawing method as set forth in claim 1, wherein said start point memory step includes a maximum X axis component value extraction step of comparing the polygon vertex data and extracting one of the polygon vertex data having a maximum X axis direction component value, said interpolation step is carried out from a vertex corresponding to the maximum X axis component value shown by said maximum X axis component value extraction step along the outline of the polygon in a Y axis direction, and said polygon interpolate span is drawn as stacked in an X axis direction.

6. A polygon drawing method as set forth in claim 1, wherein said start point memory step includes a minimum component value extraction step of comparing the polygon vertex data and extracting one of the polygon vertex data having smallest X and Y axis direction component values, a polygon X length calculation step of calculating an X direction polygon length in an X axis direction, a polygon Y length calculation step of calculating a Y direction polygon length in a Y axis direction, and a shortest length calculation step of comparing the X direction polygon length with the Y axis direction polygon length and determining one of the X and Y directions having a shorter length as a shorter length direction, and wherein said interpolation step is carried out from a vertex corresponding to the minimum X and Y axis direction component values extracted by said minimum component extraction step along the outline of the polygon in a direction other than the shorter length direction, and said polygon interpolate span is drawn as stacked in the shorter length direction.

7. A polygon drawing method as set forth in claim 1, wherein said start point memory step includes a maximum component value extraction step of comparing the polygon vertex data and extracting one of the polygon vertex data having largest X and Y axis direction component values, a polygon X length calculation step of calculating a polygon length in an X axis direction, a polygon Y length calculation step of calculating a polygon length in a Y axis direction, and a shortest length calculation step of comparing the X direction polygon length with the Y axis direction polygon length and determining one of the X and Y directions having the shorter length, and wherein line interpolation is carried out from a vertex corresponding to the largest X and Y axis direction component values shown by said maximum component extraction step along the outline of the polygon in the other direction not determined by said shortest length calculation step, and said polygon interpolate span is drawn as stacked in the axis direction determined by said shortest length calculation step.

8. A polygon drawing method as set forth in claim 1, wherein the polygon has more than three vertices.

9. A polygon drawing method as set forth in claim 8, wherein:

said vertex address addition step comprises generating addresses corresponding to further clockwise polygon vertices;

said vertex address subtraction step comprises generating addresses corresponding to further counterclockwise polygon vertices;

said vertex address addition step and said vertex address subtraction step are stopped when one of said further clockwise polygon vertices and one of said further counterclockwise polygon vertices coincide; and said interpolation step is performed on the basis of at least said addresses of said further clockwise and counterclockwise polygon vertices.

10. A polygon drawing system having a display for displaying data, image memory means for temporarily storing the data to be displayed and line drawing means for calculating a portion of the data relating to a line connecting two points on the basis of portions of the data indicating coordinates of the two points, said system comprising:

a polygon vertex register for storing polygon vertex data relating to a polygon;

vertex management means for controllably causing said polygon vertex register to store the polygon vertex data under a predetermined condition;

a start point register for sequentially monitoring the polygon vertex data being input to the polygon vertex register, determining one of the polygon vertex data to be used as a drawing start vertex and storing a portion of the polygon vertex data relating to the drawing start vertex;

outline generation means for sequentially controlling a sequence of generating an outline of the polygon;

vertex address addition means for outputting to said polygon vertex register an address at which a next clockwise polygon vertex data is stored according to the outline of the polygon;

vertex address substraction means for outputting to said polygon vertex register an address at which a next counterclockwise polygon vertex data is stored according to the outline of the polygon;

interpolation means for performing an interpolating operation over clockwise and counterclockwise portions of the outline on the basis of the next clockwise and counterclockwise polygon vertex data; and line drawing means for drawing a polygon interpolate span with ends located on the clockwise and counterclockwise portions of the outline, wherein said interpolating operation is carried out with respect to the clockwise and counterclockwise portions of the outline at the same time, and at each time when the interpolating operation is carried out, drawing of said polygon interpolate span is carried out from said drawing start vertex along the outline of the polygon.

11. A polygon drawing system as set forth in claim 10, wherein said start point register includes a minimum Y axis component value extraction means for comparing the polygon vertex data and extracting one of the polygon vertex data having a smallest Y axis direction component value, said interpolating operation is carried out from a vertex corresponding to the minimum Y axis component value shown by said minimum Y axis component value extraction means along the outline of the polygon in an X axis direction, and said polygon interpolate span is drawn as stacked in a Y axis direction.

12. A polygon drawing system as set forth in claim 10, wherein said start point register includes a maximum Y axis component value extraction means for comparing the polygon vertex data and extracting one of the polygon vertex data having a maximum Y axis direction component value, said interpolating operation is carried out from a vertex corresponding to the maximum Y axis component value shown by said maximum Y axis component value extraction means along the outline of the polygon in an X axis direction, and said polygon interpolate span is drawn as stacked in a Y axis direction.

13. A polygon drawing system as set forth in claim 10, wherein said start point register includes a minimum X axis component value extraction means for comparing the polygon vertex data having a smallest X axis direction component value, said interpolating operation is carried out from a vertex corresponding to the minimum X axis component value shown by said minimum X axis component value extraction step along the outline of the polygon in a Y axis direction, and said polygon interpolate span is drawn as stacked in an X axis direction.

14. A polygon drawing system as set forth in claim 10, wherein said start point register includes a maximum X axis component value extraction means for comparing the polygon vertex data and extracting one of the polygon vertex data having a maximum X axis direction component value, said interpolating operation is carried out from a vertex corresponding to the maximum X axis component value shown by said maximum X axis component value extraction step along the outline of the polygon in a Y axis direction, and said polygon interpolate span is drawn as stacked in an X axis direction.

15. A polygon drawing system as set forth in claim 10, wherein said start point register includes a minimum component value extraction means for comparing the polygon vertex data and extracting one of the polygon vertex data having smallest X and Y axis direction component values, a polygon X length calculation means for calculating a polygon length in an X axis direction, a polygon Y length calculation means for calculating a polygon length in a Y axis direction, and a shortest length calculation means for comparing the X direction polygon length with the Y axis direction polygon length and determining one of the X and Y directions having a shorter length to be a shorter length direction, and wherein said interpolating operation is carried out from a vertex corresponding to the minimum X and Y axis direction component values shown by said minimum component extraction step along the outline of the polygon in a direction which is not said shorter length direction, and said polygon interpolate span is drawn as stacked in the shorter length direction.

16. A polygon drawing system as set forth in claim 10, wherein said start point register includes a maximum component value extraction means for comparing the polygon vertex data and extracting one of the polygon vertex data having largest X and Y axis direction component values, a polygon X length calculation means for calculating a polygon length in an X axis direction, a polygon Y length calculation means for calculating a polygon length in a Y axis direction, and a shortest length calculation means for comparing the X direction polygon length with the Y axis direction polygon length and determining one of the X and Y directions having a shorter length to be a shorter length direction, and wherein said interpolating operation is carried out from a vertex corresponding to the largest X and Y axis direction component values shown by said maximum component extraction step along the outline of the polygon in a direction which is not said shorter length direction, and said polygon interpolate span is drawn as stacked in the shorter length direction.

* * * * *